(12) United States Patent
Kosaka (10) Patent No.: US 12,330,205 B2
(45) Date of Patent: Jun. 17, 2025

(54) VEHICLE CENTER PILLAR MEMBER AND METHOD FOR MANUFACTURING SAME

(71) Applicant: TOYODA IRON WORKS CO., LTD., Aichi (JP)

(72) Inventor: Hiroyasu Kosaka, Aichi (JP)

(73) Assignee: Toyoda Iron Works Co., Ltd., Aichi (JP)

(*) Notice: Subject to any disclaimer, the term of this patent is extended or adjusted under 35 U.S.C. 154(b) by 0 days.

(21) Appl. No.: 18/258,291

(22) PCT Filed: Dec. 23, 2021

(86) PCT No.: PCT/JP2021/047844
§ 371 (c)(1),
(2) Date: Jun. 19, 2023

(87) PCT Pub. No.: WO2022/138810
PCT Pub. Date: Jun. 30, 2022

(65) Prior Publication Data
US 2024/0051012 A1    Feb. 15, 2024

(30) Foreign Application Priority Data
Dec. 25, 2020  (JP) .................. 2020-217162

(51) Int. Cl.
*B62D 25/04* (2006.01)
*B21D 53/88* (2006.01)

(52) U.S. Cl.
CPC ............. *B21D 53/88* (2013.01); *B62D 25/04* (2013.01)

(58) Field of Classification Search
USPC .................................... 296/193.06
See application file for complete search history.

(56) References Cited

U.S. PATENT DOCUMENTS 8,402,804 B2    3/2013  Nakao et al.
8,651,562 B2 *  2/2014  Zornack ............ B62D 25/04
                                                296/193.06
(Continued)

FOREIGN PATENT DOCUMENTS

EP      3578442 A1      12/2019
JP      H06-218543 A    8/1994
(Continued)

OTHER PUBLICATIONS

International Search Report dated Feb. 15, 2022 filed in PCT/JP2021/047844.
(Continued)

*Primary Examiner* — Joseph D. Pape
(74) *Attorney, Agent, or Firm* — Millen, White, Zelano & Branigan P.C.; Miki Motohashi Iino (57) ABSTRACT

According to an embodiment, a vehicle center pillar member is formed to have a hat-shaped cross-section by press-molding a tailored blank material formed by joining a plurality of members in a longitudinal direction along at least one joining line. The vehicle center pillar member includes a top plate portion and vertical wall portions on both sides of the top plate portion. The at least one joining line of the tailored blank material in the vertical wall portions is in the same direction as a pressing direction during press molding. According to the embodiment, in a configuration of the tailored blank material, the at least one joining line is bent in such a shape that members on both sides forming the tailored blank material are fitted together in a concave-convex manner in the top plate portion.

8 Claims, 11 Drawing Sheets

(56) References Cited

U.S. PATENT DOCUMENTS

| | | |
|---|---|---|
| 2011/0016945 A1 | 1/2011 | Nakao et al. |
| 2014/0125090 A1* | 5/2014 | Braunschweig ........ C22F 1/053 |
| | | 296/193.06 |
| 2019/0359261 A1* | 11/2019 | Kosaka .................. B62D 25/04 |
| 2020/0391800 A1 | 12/2020 | Yamazaki et al. |

FOREIGN PATENT DOCUMENTS

| | | | |
|---|---|---|---|
| JP | 2703857 B2 | * | 1/1998 |
| JP | 2001-106118 A | | 4/2001 |
| JP | 2001106118 | * | 4/2001 |
| JP | 2011-025263 A | | 2/2011 |
| JP | 2012-148332 A | | 8/2012 |
| JP | 2018-122733 A | | 8/2018 |
| JP | 2018-149975 A | | 9/2018 |
| JP | 2020203508 A | * | 12/2020 |

OTHER PUBLICATIONS

EESR issued on Oct. 18, 2024 for the corresponding EP Patent Application No. 21910949.3.

* cited by examiner

ABSTRACT

VEHICLE CENTER PILLAR MEMBER AND METHOD FOR MANUFACTURING SAME

TECHNICAL FIELD

Embodiments disclosed in this application relate to a vehicle center pillar member and a method for manufacturing the same. In particular, the embodiments relate to a technique of forming a vehicle center pillar member having a hat-shaped cross-section by press molding using a tailored blank material.

BACKGROUND ART

A vehicle such as an automobile is provided with a center pillar (commonly known as a B pillar) as a structural member on a side of a vehicle body. The center pillar is disposed on the side of the vehicle body with its longitudinal direction being a vehicle height direction. Normally, the center pillar includes an outer member and an inner member, and the outer member has a hat-shaped cross-section perpendicular to the longitudinal direction. The hat-shaped cross-section has a central top plate portion and vertical wall portions on both sides of the central top plate portion. The vertical wall portion is a member provided in the width direction of the vehicle. A boundary between the top plate portion and the vertical wall portion is bent to form a ridge line in the longitudinal direction. The distance between the two ridge lines formed on the both sides, that is, the width of the top plate portion normally varies in the longitudinal direction. The width usually widens from top to bottom.

The vehicle center pillar member is usually made of steel plate and formed by pressing. Then, in order to reduce the weight of the center pillar member, by using a tailored blank material formed by joining a plurality of steel plate members, a plate thickness of the steel plate is increased only in a portion where strength is required, or a steel plate with high tensile strength is used (see JP-A-2018-122733).

SUMMARY OF INVENTION

By the way, since the tailored blank material is formed by joining a plurality of members by welding or the like, a joining line is formed between adjacent members to be joined. When the center pillar member having the hat-shaped cross-section is press-molded using the tailored blank material, the vertical wall portion is also processed by being applied with a pressing load. Conventionally, a relative arrangement of a pressing direction and a direction of the joining line of the tailored blank material is not considered at all, and the directions do not match in reality.

Figure 13:
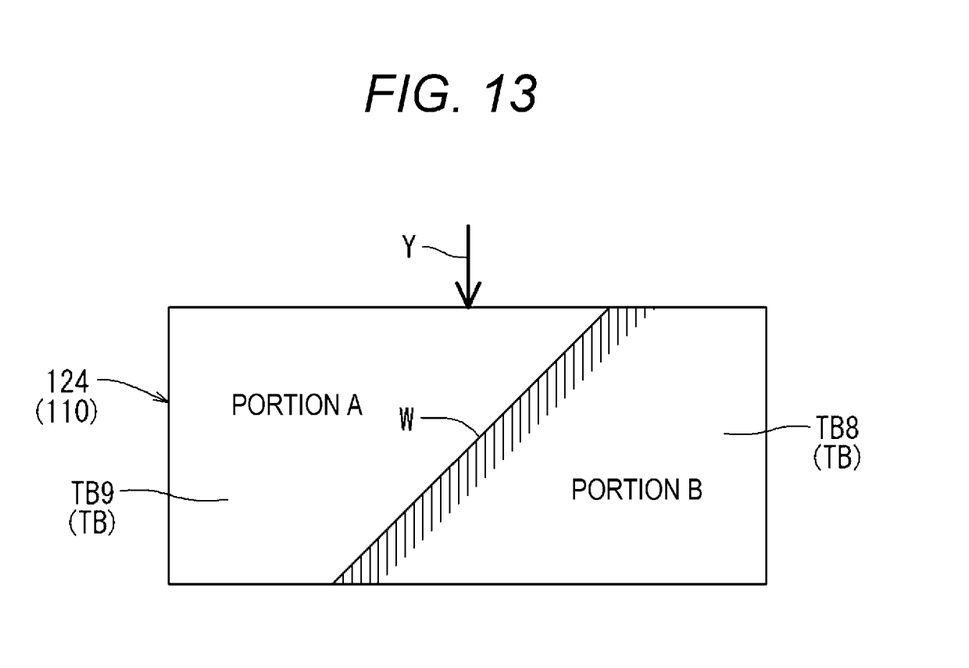
FIG. 13 is a view illustrating a joining line of the tailored blank material in a vertical wall portion of the related art and a pressing direction during molding.

FIG. 13 illustrates a joining line W of a tailored blank material TB in a vertical wall portion 124 of a center pillar outer member 110 of the related art and a pressing direction Y. As illustrated in FIG. 13, in the case of the related art, the pressing direction Y is different from the direction of the joining line W of the tailored blank material TB.

Since the steel plate members on both sides of the joining line W of the tailored blank material TB have different tensile strengths and plate thicknesses, when the pressing direction Y and a forming direction of the joining line W are different as illustrated in FIG. 13, there is a possibility that a crack occurs along the joining line W during press molding due to a difference in strength between the both sides of the joining line W. In FIG. 13, when a material strength of an A portion TB9 is high and a material strength of a B portion TB8 is low in the tailored blank material TB, an area where a crack may occur due to the difference in strength is indicated by hatched lines.

Specifically, the thickness of the steel plate in the A portion TB9 having a high material strength is difficult to change in the pressing direction Y during press molding, and the thickness of the steel plate in the B portion TB8 having a low material strength tends to change in the pressing direction Y during press molding. When there is a difference in material strength between the A portion TB9 and the B portion TB8 at the joining line W in this way, since the one with a higher material strength does not move and the one with a lower material strength moves, the one with the lower material strength is pulled in the pressing direction Y, and a crack may occur at the joining line W between the A portion TB9 and the B portion TB8.

Therefore, it is desired to avoid or restrain the crack from occurring from the joining line of the vertical wall portion when press-molding the center pillar member having the hat-shaped cross-section using the tailored blank material.

According to one embodiment, a vehicle center pillar member formed to have a hat-shaped cross-section by press-molding a tailored blank material formed by joining a plurality of members in a longitudinal direction along at least one joining line, the vehicle center pillar member including a top plate portion and vertical wall portions on both sides of the top plate portion, in which the at least one joining line of the tailored blank material in the vertical wall portions is in the same direction as a pressing direction during press molding.

According to the embodiment, in a configuration of the tailored blank material, the at least one joining line is bent in such a shape that members on both sides forming the tailored blank material are fitted together in a concave-convex manner in the top plate portion.

According to the embodiment, in the configuration of the tailored blank material, the at least one joining line extends linearly from joining lines formed on the vertical wall portions on the both sides to the top plate portion and is connected to form one corner in the top plate portion.

According to the embodiment, in the configuration of the tailored blank material, the at least one joining line extends linearly from the vertical wall portions on the both sides to the top plate portion, and is connected via an arc-shaped portion in the top plate portion.

According to the embodiment, in the configuration of the tailored blank material, the at least one joining line extends linearly from the vertical wall portions on the both sides to the top plate portion, and is connected via another linear portion in the top plate portion, to form two corners at both ends of the linear portion.

According to the embodiment, a lower door hinge mounting portion, a joining portion to a side sill of a vehicle body, and a widened region between the lower door hinge mounting portion and the joining portion are included, and one of the at least one joining line is located in the widened region.

According to another embodiment, in a method for manufacturing the aforementioned vehicle center pillar member, the vehicle center pillar member is molded by forming the tailored blank material so that the at least one joining line in the vertical wall portion is in the same direction as the pressing direction, and by pressing the tailored blank material in the pressing direction.

DESCRIPTION OF EMBODIMENTS

Hereinafter, various embodiments will be described with reference to the drawings. Note that directions such as up and down, front and rear, left and right in the description using the drawings indicate directions in the drawings. However, directions indicated individually are according to the individual indication. In addition, when there are corresponding component parts on the left and right, and referring to the left and right parts individually, L is added to the left part and R is added to the right part at an end of reference numerals indicating the parts.

<Basic Configuration of Center Pillar Outer Member>

Figure 1:
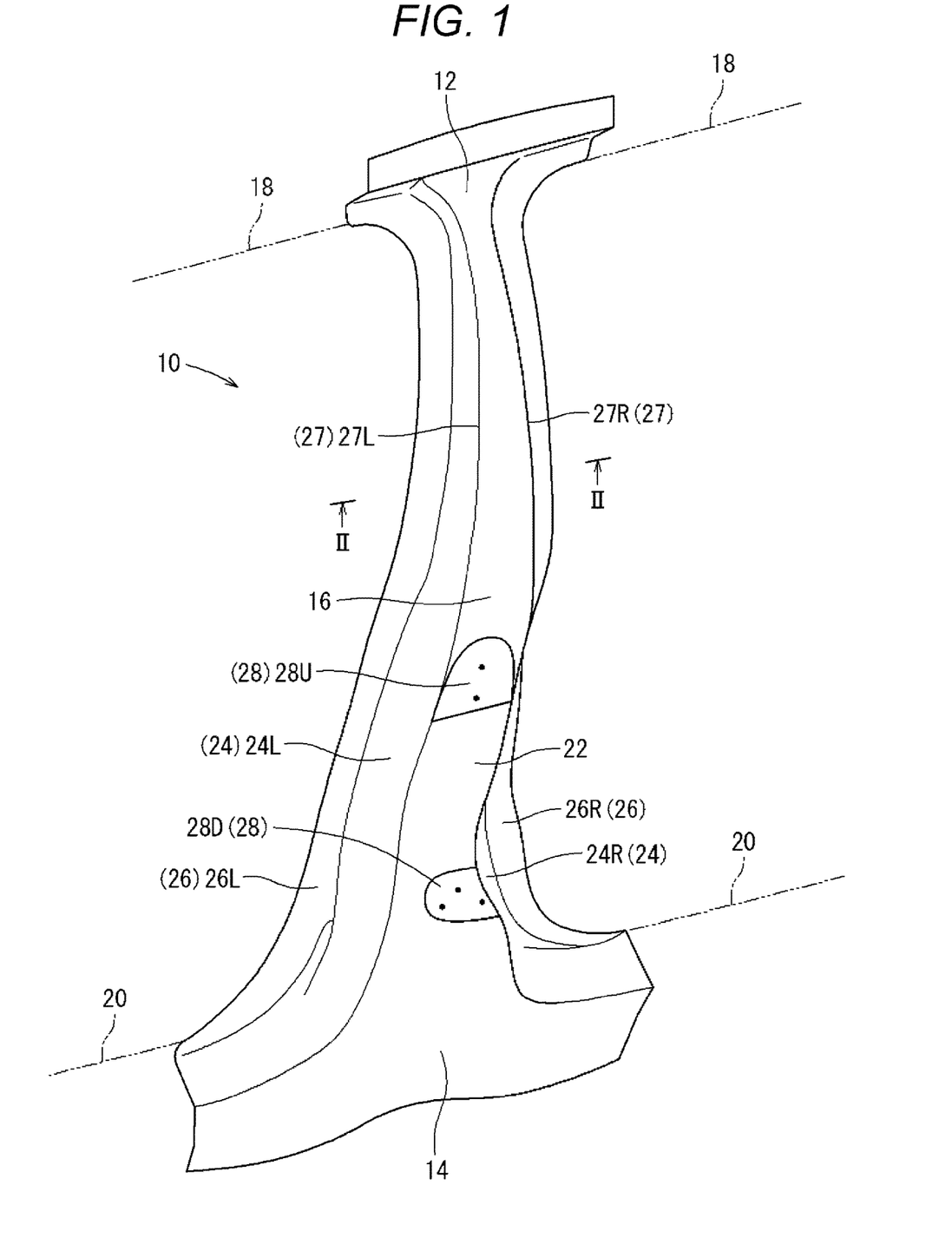
FIG. 1 is a perspective view illustrating an external configuration of a center pillar outer member as one embodiment.

FIG. 1 illustrates a perspective view of a center pillar provided on a side of a vehicle body of a passenger car as one embodiment. Specifically, the center pillar is normally configured as a closed cross-section structural member from an outer member and an inner member, but FIG. 1 illustrates only a center pillar outer member 10. The center pillar outer member 10 is arranged in such a manner that its longitudinal direction is a height direction of a vehicle (an up and down direction as viewed in FIG. 1), and includes mounting portions 12 and 14 at upper and lower ends and a middle beam portion 16. The mounting portion 12 at the upper end is joined to a roof 18 and the mounting portion 14 at the lower end is joined to a side sill 20. Note that in general, the mounting portions 12 and 14 at the upper and lower ends are formed in T-shapes in order to increase a joining area with the roof 18 and the side sill 20, and are formed into a complicated shape by drawing or the like. The middle beam portion 16 has a relatively simple shape.

<Hat-Shaped Cross-Section>

Figure 2:
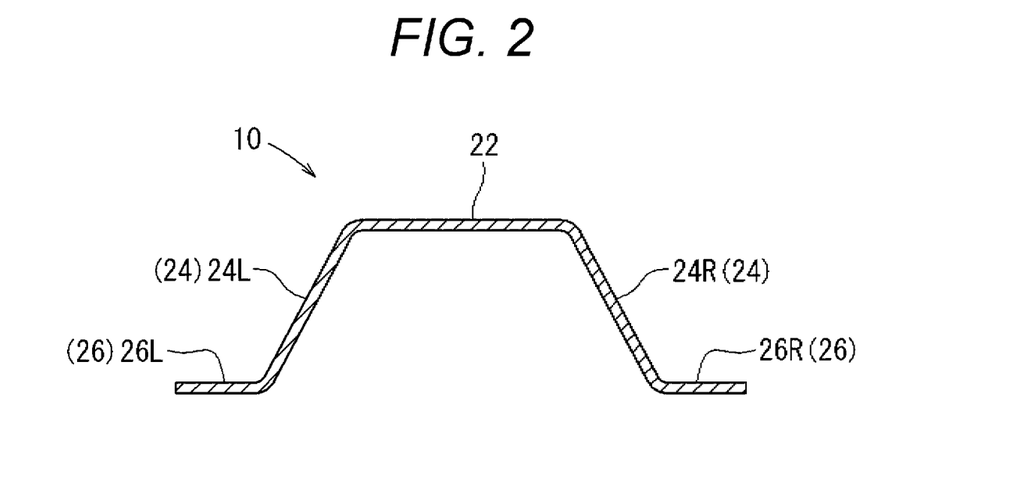
FIG. 2 is a cross-sectional view schematically illustrating a basic configuration of a cross-section of the center pillar outer member taken along a line II-II in FIG. 1.

FIG. 2 schematically illustrates a basic shape of a cross-section of the center pillar outer member 10 taken along a line II-II in FIG. 1. The center pillar outer member 10 is formed to have a hat-shaped cross-section. The hat-shaped cross-section is generally formed by a central top plate portion 22, vertical wall portions 24 located on both sides of the top plate portion 22, and flange portions 26 located on both sides of the vertical wall portions 24. Note that the vertical wall portions 24 include a vertical wall portion 24L on a vehicle front side (left side as viewed in FIG. 2) and a vertical wall portion 24R on a vehicle rear side (right side), and the flange portions 26 also include a flange portion 26L on the left side and a flange portion 26R on the right side. As illustrated in FIG. 1, ridge lines 27 are formed at boundaries between the top plate portion 22 and the vertical wall portions 24, and a width between ridge lines 27L and 27R on the left and right varies in the longitudinal direction. For example, a width of the beam portion 16 widens from top to bottom.

<Hinge Mounting Portion for Rear Door>

As illustrated in FIG. 1, the top plate portion 22 in the middle beam portion 16 is, at two upper and lower positions, provided with door hinge mounting portions 28U and 28D for mounting hinges (not illustrated) of a rear door provided on the rear side (right side as viewed in FIG. 2) of the center pillar outer member 10. Note that the center pillar outer member 10 illustrated in FIG. 1 is formed by press molding from a tailored blank material TB formed by joining a plurality of members in the longitudinal direction, but in FIG. 1, a joining line forming the tailored blank material TB is omitted.

<Press Molding>

Figure 3:
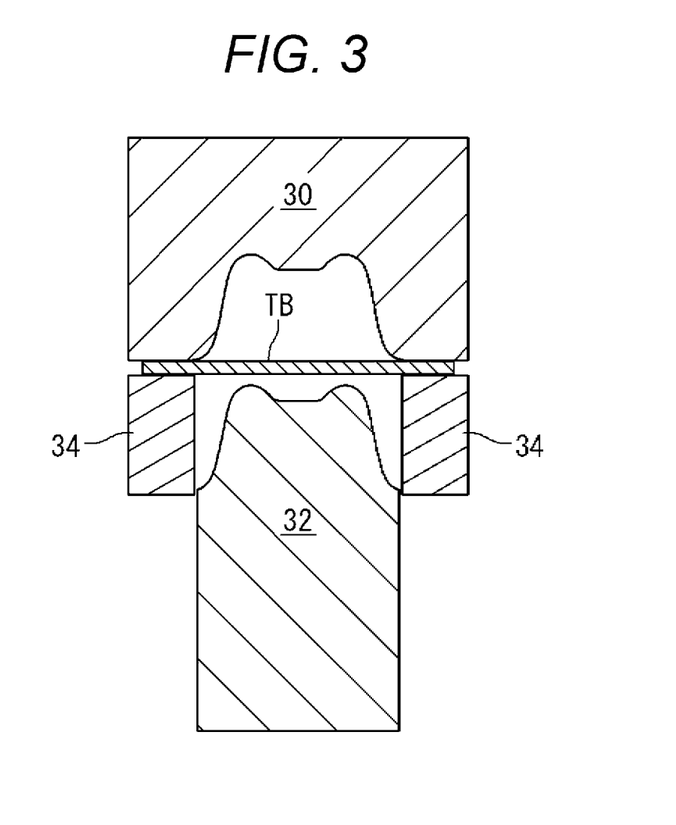
FIG. 3 is a view illustrating a point in time when an upper blade descending from a top dead center and a blank holder come into contact with a tailored blank material in a press molding process of the center pillar outer member.
Figure 4:
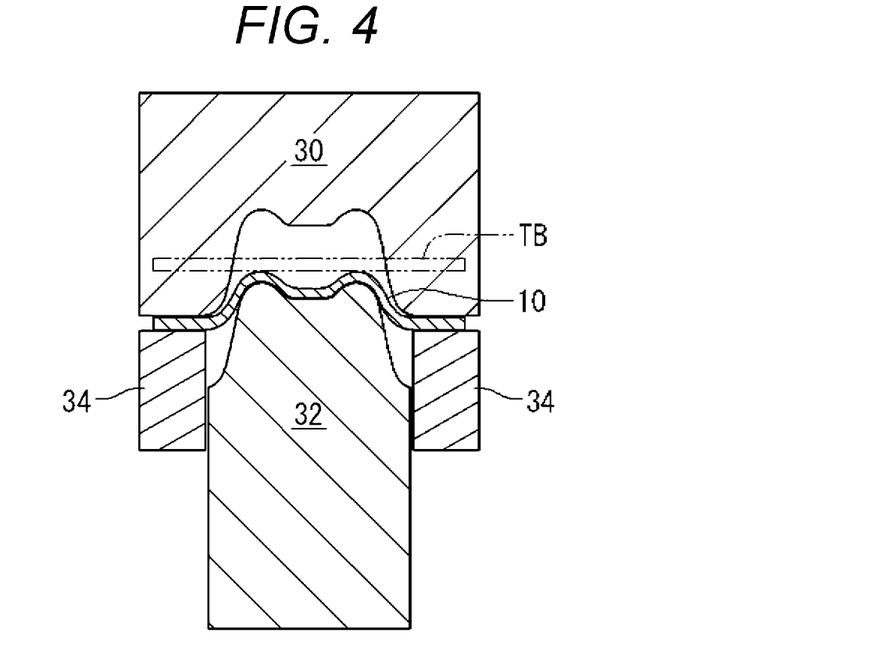
FIG. 4 is a view illustrating a state in the middle of molding in the press molding process of the center pillar outer member.
Figure 5:
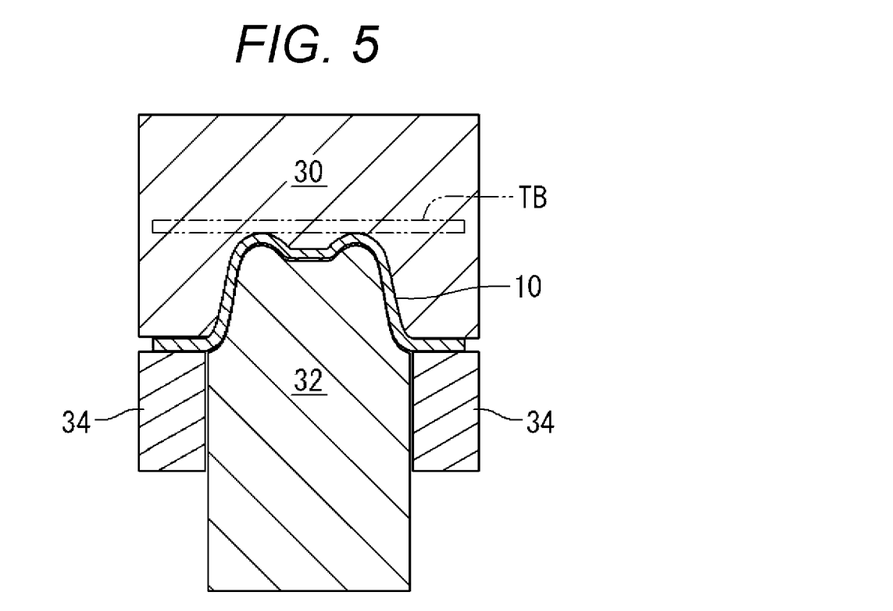
FIG. 5 is a view illustrating a state after molding (of a bottom dead center) in the press molding process of the center pillar outer member.

FIGS. 3 to 5 illustrate a press molding process of the center pillar outer member 10. FIG. 3 illustrates a point in time when an upper blade 30 descending from a top dead center and a blank holder 34 come into contact with the tailored blank material TB. FIG. 4 illustrates a state in the middle of molding. FIG. 5 illustrates a state after molding (of a bottom dead center). Specifically, the press molding process performs drawing, and the movable upper blade 30 is moved toward a lower punch 32 to draw the tailored blank material TB, to mold the center pillar outer member 10 having the hat-shaped cross-section illustrated in FIG. 1. Note that a direction in which the movable upper blade 30 is moved is a pressing direction during press molding.

A state before molding (of the top dead center) illustrated in FIG. 3 is a state before molding in which the tailored blank material TB is sandwiched between the upper blade 30 and the blank holder 34 and set above the punch 32. Note that the upper blade 30 and the blank holder 34 move downward integrally from this state.

The state in the middle of molding illustrated in FIG. 4 illustrates the state in the middle of molding in which the upper blade 30 is moved downward from the state in FIG. 3, and an upper surface of the punch 32 pushes up a central portion of the tailored blank material TB for draw forming. Note that a position of the tailored blank material TB indicated by a broken line in FIG. 4 indicates a position of the tailored blank material TB before molding as illustrated in FIG. 3.

The state after molding (of the bottom dead center) illustrated in FIG. 5 illustrates a state in which molding of the center pillar outer member 10 having the hat-shaped cross-section is completed with the upper blade 30 moved to the bottom dead center of the press molding. Note that the position of the tailored blank material TB indicated by the broken lines in FIG. 5 indicates the position of the tailored blank material TB before molding as illustrated in FIG. 3, as in the case of FIG. 4. Note that the upper blade 30 in the press molding of the present embodiment may be called an upper die, and similarly, the punch 32 and the blank holder 34 may be called a lower die.

<Detailed Configuration of Center Pillar Outer Member>

Figure 6:
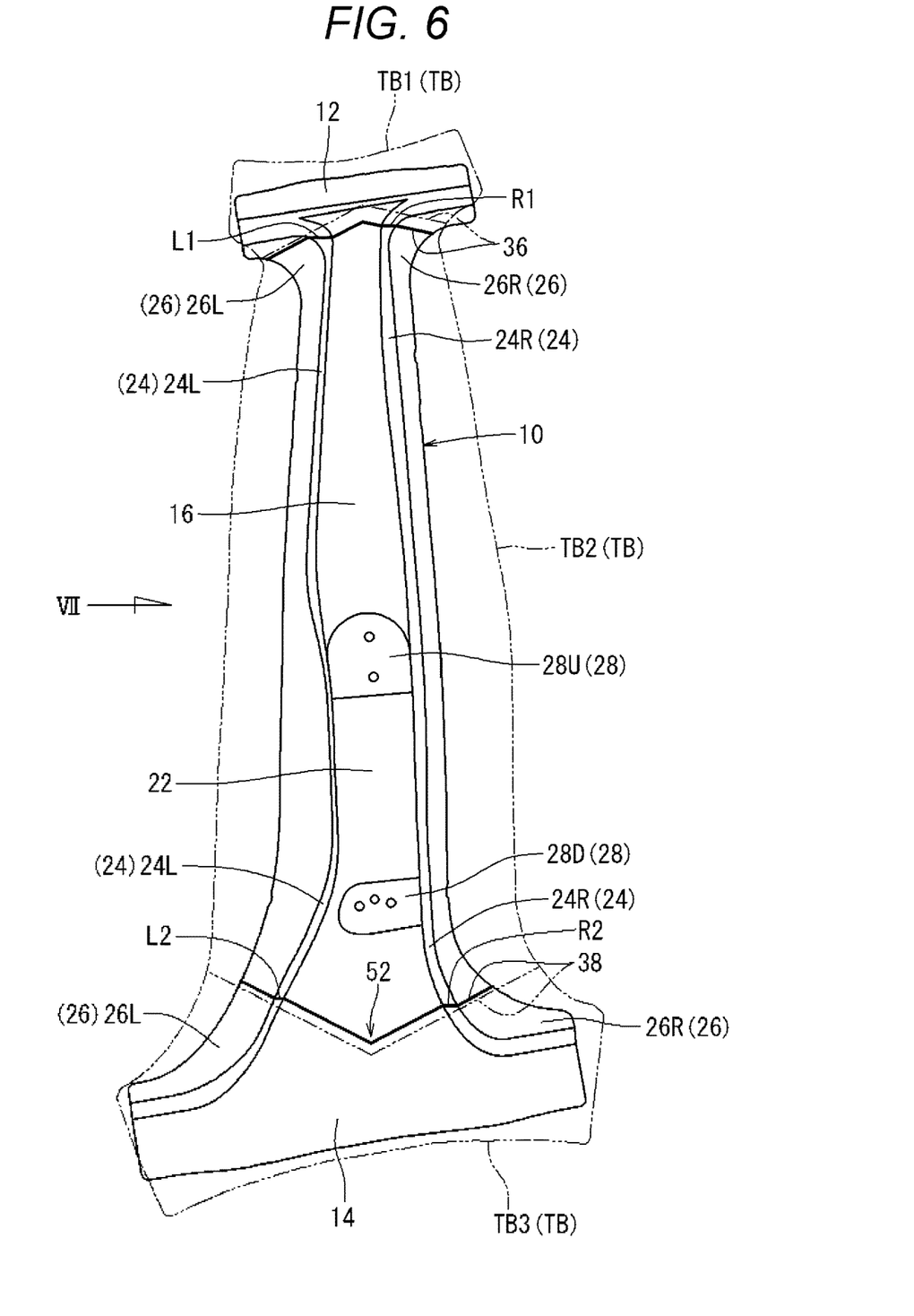
FIG. 6 is a side view of the center pillar outer member as seen from a side of a vehicle.
Figure 7:
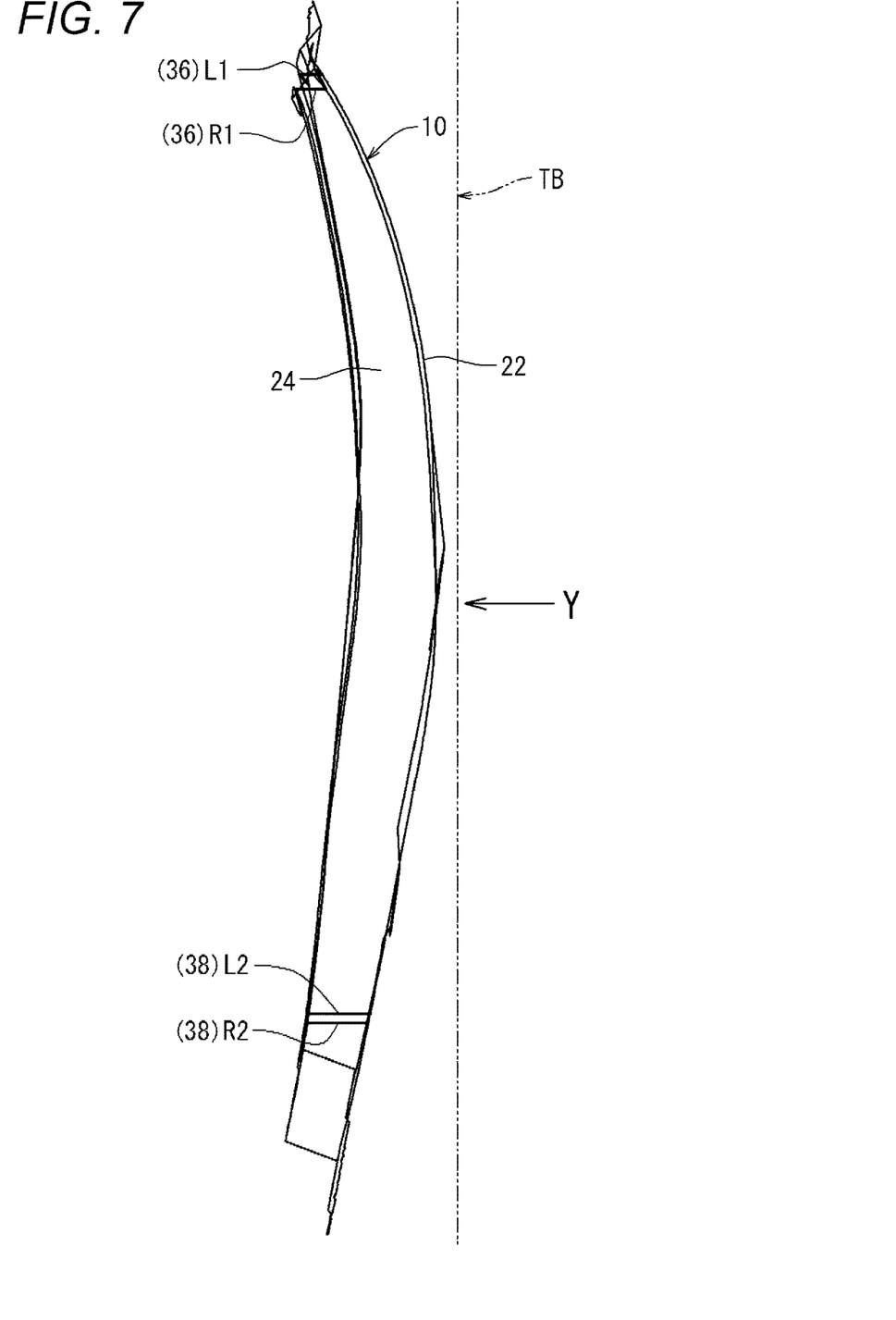
FIG. 7 is a view of the center pillar outer member as seen from an arrow VII in FIG. 6.

Next, a detailed configuration of the center pillar outer member 10 will be described with reference to FIGS. 6 and 7. FIG. 6 illustrates a side view as seen from a lateral direction of the vehicle, and FIG. 7 illustrates a view as seen from an arrow VII in FIG. 6. Note that in FIGS. 6 and 7, solid lines indicate the center pillar outer member 10 after press molding, and two-dot chain lines indicate a state of the tailored blank material TB before press molding. Therefore, the state of the tailored blank material TB indicated by the two-dot chain lines becomes the center pillar outer member 10 indicated by the solid lines by press molding.

As indicated by the two-dot chain lines in FIG. 6, the tailored blank material TB is formed in an elongated shape by joining three plate members in the longitudinal direction. These three plate members include an upper member TB1, a central member TB2 and a lower member TB3, the upper member TB1 and the central member TB2 are integrally joined at a first joining line 36, and the central member TB2 and the lower member TB3 are integrally joined at a second joining line 38. This integral joining is usually performed by welding (tailored welded blank). Note that the upper member TB1 is a portion corresponding to the mounting portion 12 at the upper end described above, and the lower member TB3 a portion corresponding to the mounting portion 14 at the lower end. Generally, the central member TB2 is a stronger member than the upper member TB1 and the lower member TB3.

In the present embodiment, the first joining line 36 is formed between the mounting portion 12 at the upper end and the beam portion 16, and the second joining line 38 is formed between the beam portion 16 and the mounting portion 14 at the lower end. Specifically, the second joining line 38 is formed between the door hinge mounting portion 28D for mounting a lower hinge of the rear door and a joining portion to the side sill 20 (see FIG. 1). Note that combinations of tailored blank materials TB to be joined include, for example: a combination of members having the same strength, one having a thick plate thickness and the other having a thin plate thickness; a combination of members having the same plate thickness but different strengths; and a combination of members having different thicknesses and strengths. The material is generally a combination of steel plates, but there is also a combination of steel and a different material such as aluminum.

<Direction of Joining Line in Vertical Wall Portion>

The shapes of the joining lines 36 and 38 of the tailored blank material TB are formed such that portions L1, L2, R1, and R2 passing through the vertical wall portions 24L and 24R after molding are in the same direction as the pressing direction Y during molding as illustrated in FIG. 7. In FIG. 7, a portion of the first joining line 36 formed on the vertical wall portion 24L on the vehicle front side (left side as viewed in FIG. 6) is denoted by a reference numeral L1, and a portion formed on the vertical wall portion 24R on the vehicle rear side (right side) is denoted by a reference numeral R1. Similarly, a portion of the second joining line 38 formed on the vertical wall portion 24L on the vehicle front side (left side as viewed in FIG. 6) is denoted by a reference numeral L2, and a portion formed on the vertical wall portion 24R on the vehicle rear side (right side) is denoted by a reference numeral R2. Note that in FIG. 7, for convenience of understanding, the right side portion R2 of the second joining line 38, which should not be visible from a viewing direction in FIG. 7 (the arrow VII in FIG. 6), is also indicated by a solid line. Further, in FIG. 7, the pressing direction is indicated by an arrow Y. Therefore, the pressing direction Y and the portions L1 and L2 formed on the left vertical wall portion 24L described above of the joining lines 36 and 38 are in the same direction. Similarly, the pressing direction Y and the portions R1 and R2 of the joining lines 36 and 38 formed on the right vertical wall portion 24R described above are also in the same direction.

As one embodiment, the pressing direction Y is set in consideration of springback of the center pillar outer member 10 after press molding. For example, the pressing direction Y is set so that an amount of springback between an upper portion (the L1 side) and a lower portion (the L2 side) of the center pillar outer member 10 is within a range of 5% to 10% in the pressing direction Y depending on a tensile strength of the steel plate.

The reason why the portions L1 and L2 formed on the left vertical wall portion 24L and the portions R1 and R2 formed on the right vertical wall portion 24R of the joining lines 36 and 38 are set in the same direction as the pressing direction Y is that in the press molding process described above, it is taken into consideration that a pressing load of the drawing acts on the vertical wall portions 24L and 24R in particular. In press molding, after the tailored blank material TB is set as illustrated in FIG. 3, the drawing is performed as illustrated in FIGS. 4 and 5 to form the center pillar outer member 10 indicated by the solid lines. Then, during the drawing, the directions of the portions L1, L2, R1, and R2 formed on the vertical wall portions 24L and 24R of the joining lines 36 and 38 are the same as the pressing direction Y as illustrated in FIG. 7.

<Position of Second Joining Line>

Next, the position and shape of the second joining line 38 set at the lower portion of the tailored blank material TB forming the center pillar outer member 10 in the above embodiment will be described. As illustrated in FIG. 6, the joining lines 36 and 38 are joining lines for joining a plurality of plate members TB1, TB2, and TB3 constituting the tailored blank material TB, and the second joining line 38 of them is a line for joining the beam portion 16 and the mounting portion 14 at the lower end. The second joining line 38 is formed in a widened region between the door hinge mounting portion 28D for mounting the lower hinge of the rear door and the joining portion to the side sill 20 (see FIG. 1) of the vehicle body.

<Shape of Second Joining Line in Top Plate Portion>

In the configuration of the tailored blank material TB, the second joining line 38 is formed by extending the portions L2 and R2 formed on the vertical wall portions 24L and 24R on both sides of the center pillar outer member 10 to the top plate portion 22 and connecting them to each other at the top plate portion 22. In the top plate portion 22, a lower edge of the beam portion 16 is convex, and an upper edge of the mounting portion 14 at the lower end is concave, so that they are joined in a concave-convex fitting 52 in the longitudinal direction.

Specific Embodiment 1 of Second Joining Line: Connection to Arc

Figure 8:
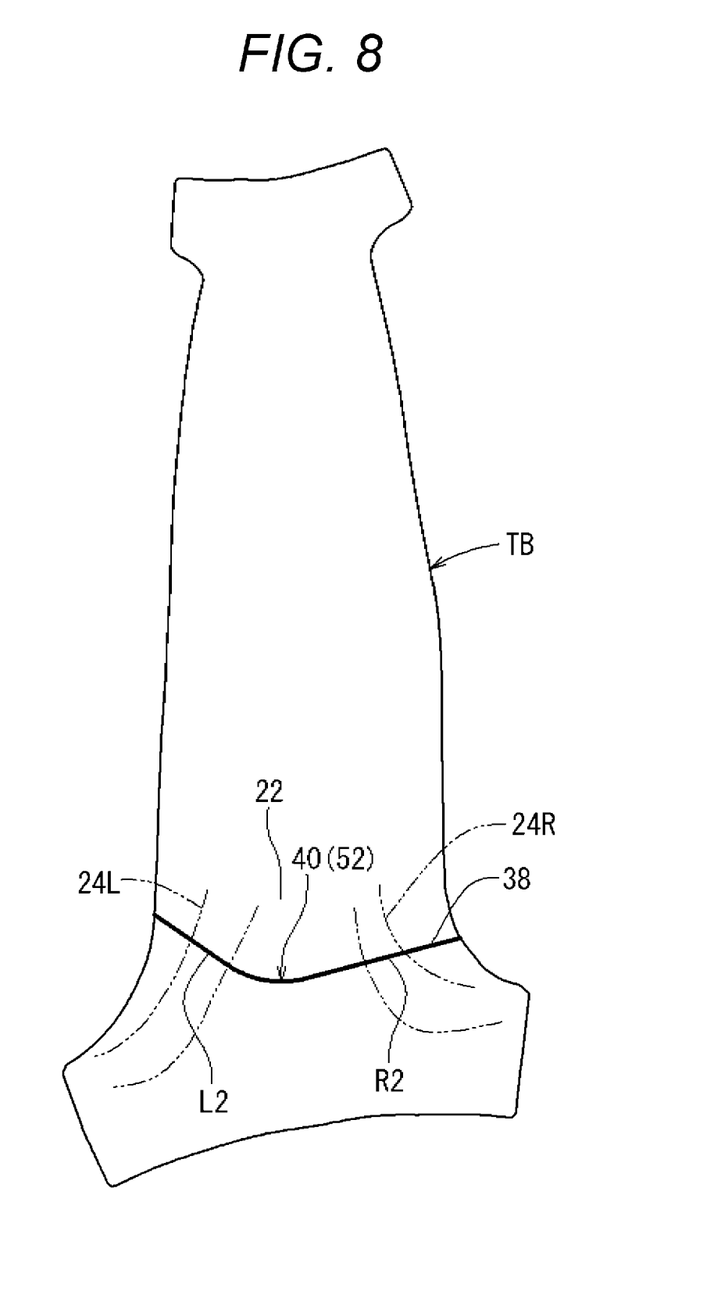
FIG. 8 is a view illustrating a second joining line formed in the tailored blank material as one embodiment.

As illustrated in FIG. 8, as one embodiment, in the configuration of the tailored blank material TB, the second joining line 38 can be extended straight directly from the portions L2 and R2 formed on the vertical wall portions 24L and 24R to the top plate portion 22 and be connected to an arc 40 at the top plate portion 22. When a form of the concave-convex fitting 52 of the second joining line 38 is the arc 40 in this manner, it is possible to avoid stress concentration on the second joining line 38 of the top plate portion 22 during press molding of the center pillar outer member 10 or when the vehicle is subjected to a side impact.

Figure 9:
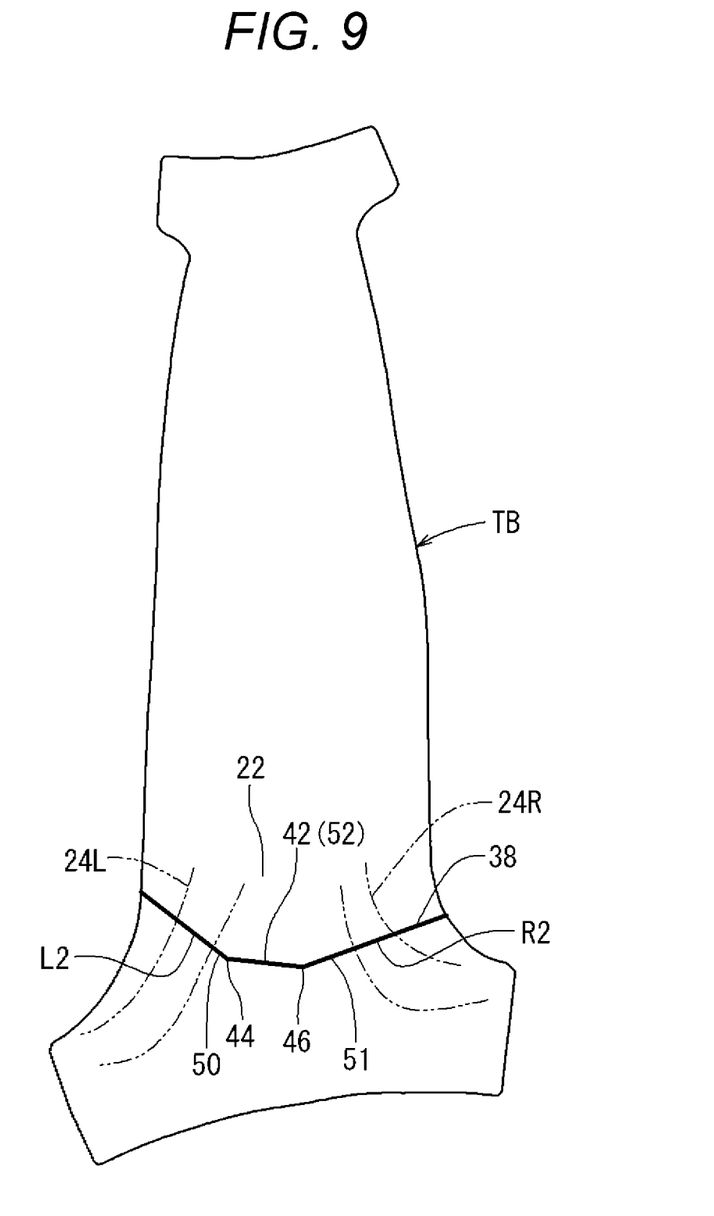
FIG. 9 is a view illustrating the second joining line as another embodiment.

Specific Embodiment 2 of Second Joining Line:
Connection by Another Straight Line As illustrated in FIG. 9, as another embodiment, in the configuration of the tailored blank material TB, the second joining line 38 has extension portions 50 and 51 linearly extending from the portions L2 and R2 formed on the vertical wall portions 24L and 24R to the top plate portion 22, where the extension portions 50 and 51 can be connected to each other via another linear portion 42. Thus, corners 44 and 46 are formed at intersections (both ends of the linear portion 42) between the linear portion 42 and the extension portions 50 and 51 described above. In this configuration, it is possible to reduce a length in the longitudinal direction of one member of the tailored blank material TB to be combined to form the center pillar outer member 10 compared to the cases of the above-described embodiment 1 and a below-described embodiment 3. Thus, the yield can be improved.

Specific Embodiment 3 of Second Joining Line:
Connection at One Corner

Figure 10:
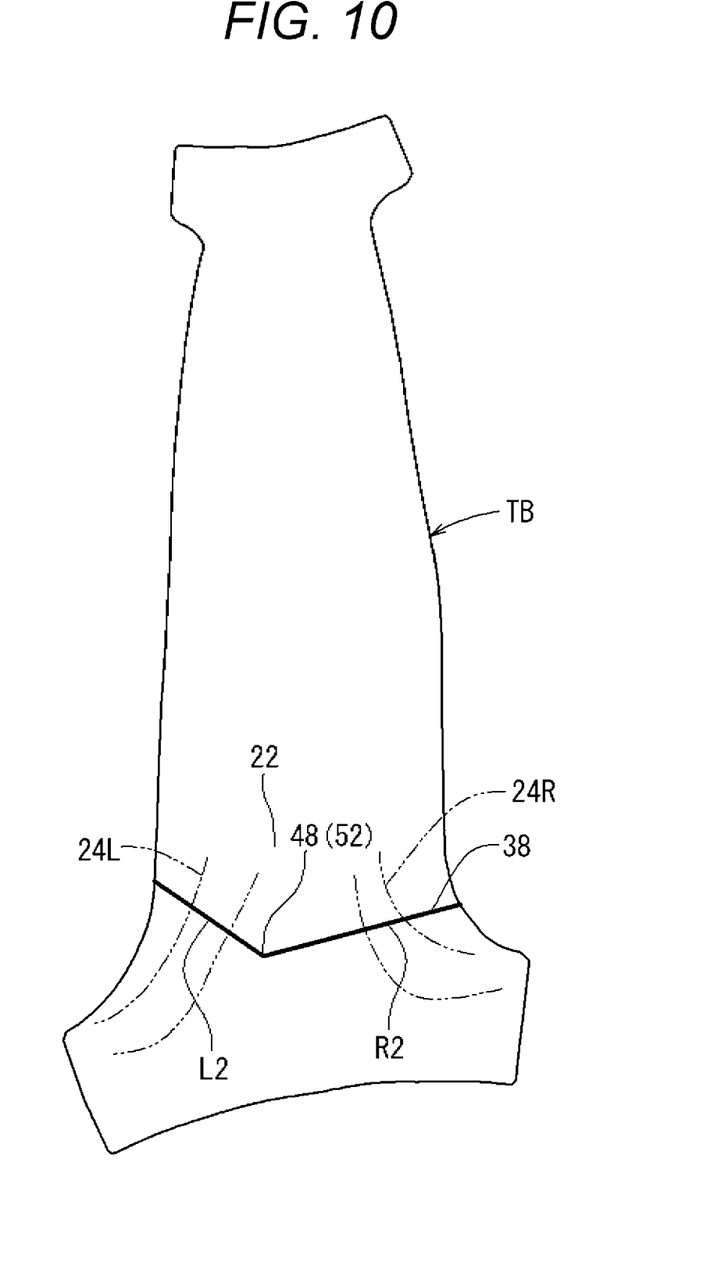
FIG. 10 is a view illustrating the second joining line as still another embodiment.

As illustrated in FIG. 10, as still another embodiment, in the configuration of the tailored blank material TB, the second joining line 38 can be extended straight directly from the portions L2 and R2 formed on the vertical wall portions 24L and 24R to the top plate portion 22 and formed with a corner 48 at one point. Note that the second joining line 38 drawn by the two-dot chain lines in FIG. 6 is a virtual representation of the second joining line 38 of the tailored blank material TB in FIG. 10. When the second joining line 38 has such a simple shape, it is easy to form the second joining line 38.

Advantages of Above Embodiments

Figure 11:
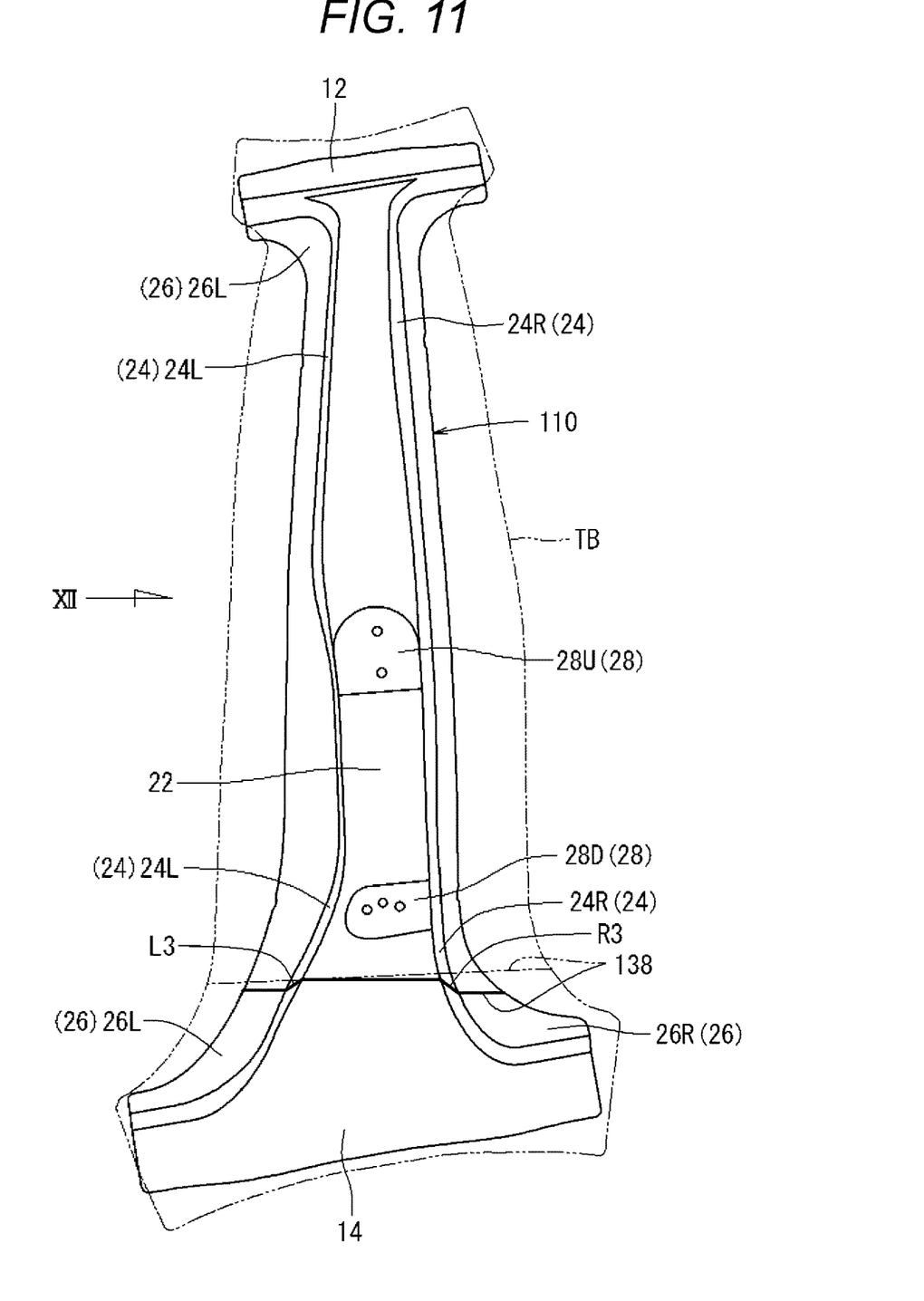
FIG. 11 is a side view of a center pillar outer member of the related art as seen from the side of the vehicle and corresponding to FIG. 6.
Figure 12:
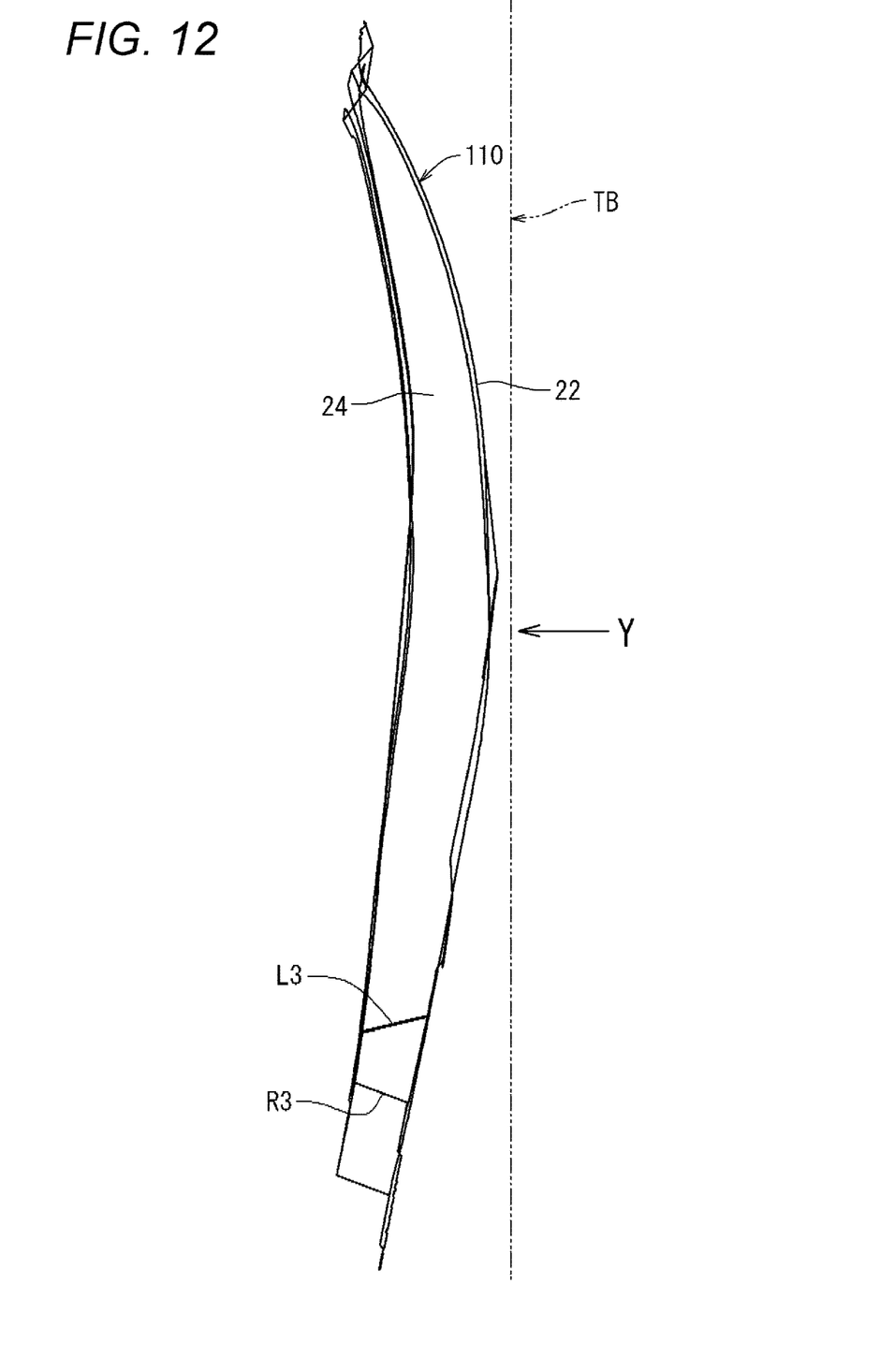
FIG. 12 is a view of the center pillar outer member as seen from an arrow XII in FIG. 11.

FIGS. 11 and 12 illustrate a center pillar outer member 110 of the related art. FIG. 11 corresponds to FIG. 6 of the embodiment described above, and FIG. 12 corresponds to FIG. 7. As can be seen from FIG. 11, a general joining line 138 of the related art is formed linearly in the configuration of the tailored blank material TB. Therefore, during press molding, as illustrated in FIG. 12, directions of portions L3 and R3 located on the vertical wall portions 24L and 24R of the joining line 138 are different from that of the pressing direction Y during molding. When the portions L3 and R3 located on the vertical wall portions 24L and 24R of the joining line 138 are in directions different from the pressing direction Y, as described at the beginning of this specification, there is a possibility that a crack occurs along the joining line 138 due to a difference in strength between both sides of the portions L3 and R3.

In contrast, according to the embodiments described above, as illustrated in FIG. 7, the portions L1, L2, R1, and R2 formed on the vertical wall portions 24L and 24R of the joining lines 36 and 38 are formed to be in the same direction as the pressing direction Y during molding. This can avoid or reduce occurrence of a crack in the first joining line 36 and the second joining line 38.

In particular, in the above embodiments, the lower portion of the center pillar outer member 10 where the second joining line 38 is formed is the widened region between the door hinge mounting portion 28D for mounting the lower hinge of the rear door and the joining portion to the side sill 20 of the vehicle body. When the joining line is formed in such a region, since a crack is likely to occur along the joining line, an effect of aligning the direction of the joining line with the pressing direction is significant.

Other Embodiments

In the above embodiments, there are three members constituting the tailored blank material TB, and there are two joining lines between them, but the present invention is not limited to this.

Further, the form of the joining line in the top plate portion 22 is not limited to the forms illustrated in FIGS. 8 to 10, and may be another form.

Further, as another embodiment, features of the center pillar outer member described above can also be applied to a center pillar inner member.

Advantages of Embodiments

Finally, advantages of the above embodiments will be added.

In the above embodiments, at least one joining line of the tailored blank material in the vertical wall portions is in the same direction as the pressing direction during press molding. Thus, even if there is a difference in strength between adjacent portions of the tailored blank material, a tensile stress generated at the joining line during press molding is small, so that occurrence of a crack from the joining line of the vertical wall portion of the center pillar member can be avoided or reduced.

In some embodiments, in the configuration of the tailored blank material, the at least one joining line is bent in such a shape that members on both sides forming the tailored blank material are fitted together in a concave-convex manner in the top plate portion. Thus, combination in the width direction is performed with high accuracy.

In some embodiments, in the configuration of the tailored blank material, the at least one joining line extends linearly from joining lines formed on the vertical wall portions on the both sides to the top plate portion and connected to form one corner in the top plate portion. According to this configuration, since the joining line has a simple form, it is easy to form the joining line.

In some embodiments, in the configuration of the tailored blank material, the at least one joining line extends linearly from the vertical wall portions on the both sides to the top plate portion, and is connected via an arc-shaped portion in the top plate portion. According to this configuration, it is possible to avoid stress concentration during press molding of the center pillar member or when the vehicle is subjected to a side impact (at the time of side impact).

In some embodiments, in the configuration of the tailored blank material, the at least one joining line extends linearly from the vertical wall portions on the both sides to the top plate portion, and is connected via another linear portion in the top plate portion, to form two corners at both ends of the linear portion. According to this configuration, it is possible to reduce the length in the longitudinal direction of one member of the tailored blank material to be combined to form the center pillar member compared to a configuration of being connected at the one corner or the arc-shaped portion described above. Thus, the yield can be improved.

In some embodiments, the center pillar member has a lower door hinge mounting portion, the joining portion to the side sill of the vehicle body, and the widened region between the lower door hinge mounting portion and the joining portion, and one of the at least one joining line is located in the widened region of the center pillar member. Since the joining line formed on the vertical wall portion of the widened region is particularly susceptible to cracking during press molding, an effect of restraining the cracking is significant.

Although specific embodiments have been described above, the present technique is not limited to those embodiments, and various modifications, substitutions, and improvements can be made by those skilled in the art.

The invention claimed is:

1. A vehicle center pillar member formed to have a hat-shaped cross-section by press-molding a tailored blank material formed by joining a plurality of members in a longitudinal direction along at least one joining line,
the vehicle center pillar member comprising a top plate portion, a right vertical wall portion on a right side of the top plate portion, and a left vertical wall portion on a left side of the top plate portion, wherein
the at least one joining line of the tailored blank material includes a right portion in the right vertical wall portion and a left portion in the left vertical wall portion,
the right portion and the left portion extend in the same direction as a pressing direction during press molding, and
the right portion extends in a direction that is the same direction as the left portion extends when viewed in a direction perpendicular to the longitudinal direction of the vehicle center pillar member and perpendicular to the pressing direction.

2. The vehicle center pillar member according to claim 1, wherein in a configuration of the tailored blank material, the at least one joining line is bent in such a shape that members on both sides forming the tailored blank material are fitted together in a concave-convex manner in the top plate portion.

3. The vehicle center pillar member according to claim 2, wherein in the configuration of the tailored blank material, the at least one joining line extends linearly from joining lines formed on the right vertical wall portion and the left vertical wall portion on the both sides to the top plate portion and is connected to form one corner in the top plate portion.

4. The vehicle center pillar member according to claim 2, wherein
in the configuration of the tailored blank material, the at least one joining line extends linearly from the vertical wall portions on the both sides to the top plate portion, and is connected via an arc-shaped portion in the top plate portion.

5. The vehicle center pillar member according to claim 2, wherein in the configuration of the tailored blank material, the at least one joining line extends linearly from the first vertical wall portion and second vertical wall portion on the both sides to the top plate portion, and is connected via another linear portion in the top plate portion, to form two corners at both ends of the linear portion.

6. A vehicle center pillar member formed to have a hat-shaped cross-section by press-molding a tailored blank material formed by joining a plurality of members in a longitudinal direction along at least one joining line,
the vehicle center pillar member comprising:
a top plate portion,
vertical wall portions on both sides of the top plate portion,
a lower door hinge mounting portion,
a joining portion to a side sill of a vehicle body, and
a widened region between the lower door hinge mounting portion and the joining portion, wherein
the at least one joining line of the tailored blank material in the vertical wall portions is in the same direction as a pressing direction during press molding, and
one of the at least one joining line is located in the widened region.

7. A method for manufacturing the vehicle center pillar member according to claim 1, comprising molding the vehicle center pillar member by forming the tailored blank material so that the at least one joining line in the vertical wall portion is in the same direction as the pressing direction, and by pressing the tailored blank material in the pressing direction.

8. The vehicle center pillar member according to claim 1, wherein the right portion is parallel to the right vertical wall portion of the hat-shaped cross-section and the left portion is parallel to the left vertical wall portion of the hat-shaped cross-section.

* * * * *